(12) United States Patent
Logan et al.

(10) Patent No.: US 9,097,169 B2
(45) Date of Patent: Aug. 4, 2015

(54) GAS TURBINE ENGINE HEAT MANAGEMENT SYSTEM

(75) Inventors: Adam Logan, Hamilton (CA); Daniel Alecu, Toronto (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 324 days.

(21) Appl. No.: 13/270,289

(22) Filed: Oct. 11, 2011

(65) Prior Publication Data

US 2013/0087308 A1  Apr. 11, 2013

(51) Int. Cl.
*F02C 7/14* (2006.01)
*F02C 7/224* (2006.01)
*F01P 9/00* (2006.01)

(52) U.S. Cl.
CPC ... *F01P 9/00* (2013.01); *F02C 7/14* (2013.01); *F02C 7/224* (2013.01); *Y02T 50/675* (2013.01)

(58) Field of Classification Search
CPC ............ F02C 7/185; F02C 7/224; F01P 9/00; Y02T 50/675
USPC ................. 60/736, 266, 267, 39.08; 184/6.11
See application file for complete search history.

(56) References Cited

U.S. PATENT DOCUMENTS

| | | | |
|---|---|---|---|
| 2,764,147 A | | 9/1956 | Brunner |
| 2,842,962 A | * | 7/1958 | Dall ........................... 73/861.61 |
| 3,699,847 A | | 10/1972 | Little |
| 4,461,340 A | | 7/1984 | Hart et al. |
| 5,109,672 A | | 5/1992 | Chenoweth et al. |
| 5,318,225 A | * | 6/1994 | Condron ........................... 239/1 |
| 5,592,974 A | | 1/1997 | Grohs et al. |
| 6,196,249 B1 | * | 3/2001 | Kemmner et al. .............. 137/82 |
| 6,536,381 B2 | | 3/2003 | Langervik |
| 7,195,055 B1 | | 3/2007 | Jaeger |
| 2002/0112679 A1 | | 8/2002 | Langervik |
| 2008/0209903 A1 | * | 9/2008 | Itoga et al. ...................... 60/471 |
| 2009/0101444 A1 | * | 4/2009 | Alecu .......................... 184/11.2 |
| 2010/0154427 A1 | * | 6/2010 | Logan ............................. 60/772 |
| 2010/0186943 A1 | * | 7/2010 | Sun et al. ....................... 165/299 |
| 2010/0190124 A1 | * | 7/2010 | Castelain ...................... 432/227 |

* cited by examiner

*Primary Examiner* — Phutthiwat Wongwian
*Assistant Examiner* — Jason H Duger
(74) *Attorney, Agent, or Firm* — Norton Rose Fulbright Canada LLP

(57) ABSTRACT

A heat management system of a gas turbine engine for cooling oil and heating fuel, includes an oil circuit having parallel connected first and second branches. The first branch includes a fuel/oil heat exchanger and a first fixed restrictor in series and the second branch includes an air cooled oil cooler and a second fixed restrictor. The first and second fixed restrictors limit respective oil flows through the first and second branch differently, in response to viscosity changes of the oil caused by temperature changes of the oil during engine operation to modify oil distribution between the first and second branches.

11 Claims, 3 Drawing Sheets

GAS TURBINE ENGINE HEAT MANAGEMENT SYSTEM

TECHNICAL FIELD

The application relates generally to gas turbine engines, and more particularly, to a heat management system of a gas turbine engine for cooling oil and heating fuel.

BACKGROUND OF THE ART

A heat management system of a gas turbine engine conventionally includes a fuel/oil heat exchanger (FOHE) to transfer heat from the hot oil to the cold fuel in order to heat the cold fuel to a desired temperature. An air cooled oil cooler (ACOC) is also conventionally provided in the heat management system to further cool the hot oil to a lower temperature in order to be recycled in an oil circuit of the engine. ACOCs and FOHEs are conventionally connected in series and a thermal static valve is also provided to allow an oil flow to selectively bypass the ACOC, for example in cold oil conditions. However, the conventional thermal static valves generally have very low reliability, which drives up maintenance costs.

Accordingly, there is a need to provide an improved system for gas turbine engines.

SUMMARY

In one aspect, there is provided a heat management system of a gas turbine engine for cooling oil and heating fuel, the system comprising an oil circuit having connected first and second branches in a parallel configuration, the first branch including a fuel/oil heat exchanger for transferring heat from an oil flow through the first branch, to a fuel flow and a first fixed restrictor for restricting the oil flow through the first branch, the second branch including an air cooled oil cooler for air cooling an oil flow through the second branch and a second fixed restrictor for restricting the oil flow through the second branch, the first and second fixed restrictors having respective fixed passage geometries, the passage geometry of the second fixed restrictor having a total flow contact area greater than a total flow contact area of the first fixed restrictor such that in response to an oil viscosity increase, the second fixed restrictor provides a larger flow resistance increase than a flow resistance increase provided by the first fixed restrictor.

In another aspect, there is provided a heat management system of a gas turbine engine for cooling oil and heating fuel, the system comprising an oil circuit having connected first and second branches in a parallel configuration, the first branch including a fuel/oil heat exchanger for transferring heat from an oil flow through the first branch, to a fuel flow and a first fixed restrictor disposed downstream of the fuel/oil heat exchanger for restricting the oil flow through the first branch, the second branch including an air cooled oil cooler for air cooling an oil flow through the second branch and a second fixed restrictor disposed downstream of the air cooled oil cooler for restricting the oil flow through the second branch, wherein the first fixed restrictor includes a diaphragm having a flow orifice and the second fixed restrictor includes a plurality of holes extending through a body, the holes being small and long with respect to the flow orifice of the first fixed restrictor.

In a further aspect, there is provided a method of managing oil cooling and fuel heating in a gas turbine engine, the method comprising a) distributing oil from a pumped oil supply into first and second oil flows, the second oil flow being parallel to the first oil flow; b) transferring heat from the first oil flow to a fuel flow; c) using ambient air to cool the second oil flow; and d) using a combination of two fixed restrictors to limit the respective first and second oil flows differently, in response to viscosity changes of the oil caused by temperature changes of the oil during engine operation.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
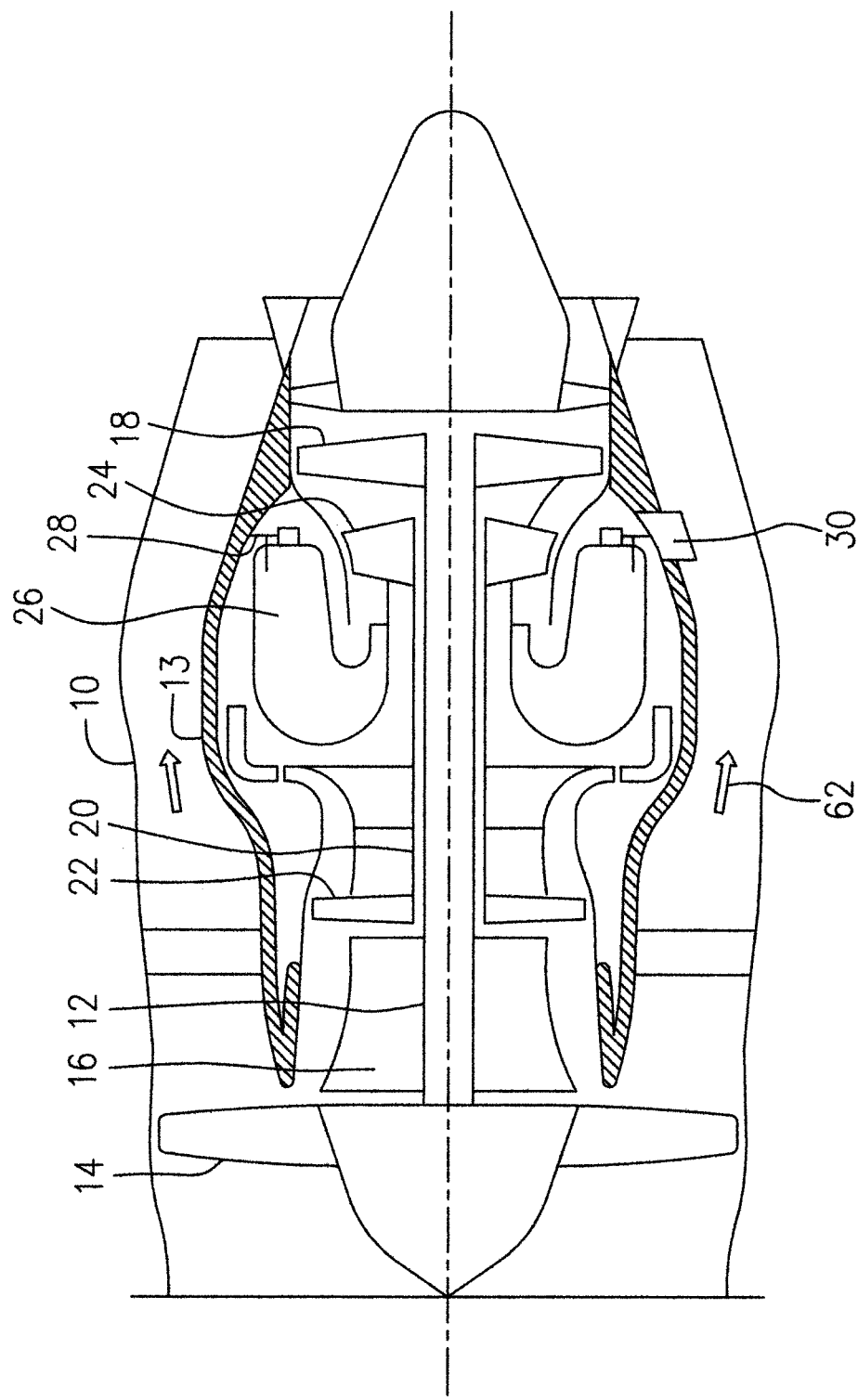
FIG. 1 is a schematic cross-sectional view of an aircraft turbofan gas turbine engine as an exemplary application of the described subject matter.

Referring to FIG. 1, an aircraft turbofan gas turbine engine includes a housing or nacelle 10, a core casing 13, a low pressure spool assembly (not numbered) which includes a fan assembly 14, a low pressure compressor assembly 16 and a low pressure turbine assembly 18 connected by a shaft 12, and a high pressure spool assembly (not numbered) which includes a high pressure compressor assembly 22 and a high pressure turbine assembly 24 connected by a turbine shaft 20. The core casing 13 surrounds the low and high pressure spool assemblies to define a main flow path or gas path (not numbered) therethrough. In the main flow path there is provided a combustion gas generator assembly 26 to generate combustion gases for powering the high and low pressure turbine assemblies 24, 18. There is also provided a fuel supply system 28 for supplying fuel to the combustion gas generator assembly 26. There is further provided a heat management system 30 for cooling hot oil circulated in an oil system (not shown) of the engine and for heating the fuel prior to being delivered for combustion. The heat management system 30 schematically illustrated in FIG. 1, does not represent a specific structure and location in the engine.

Figure 2:
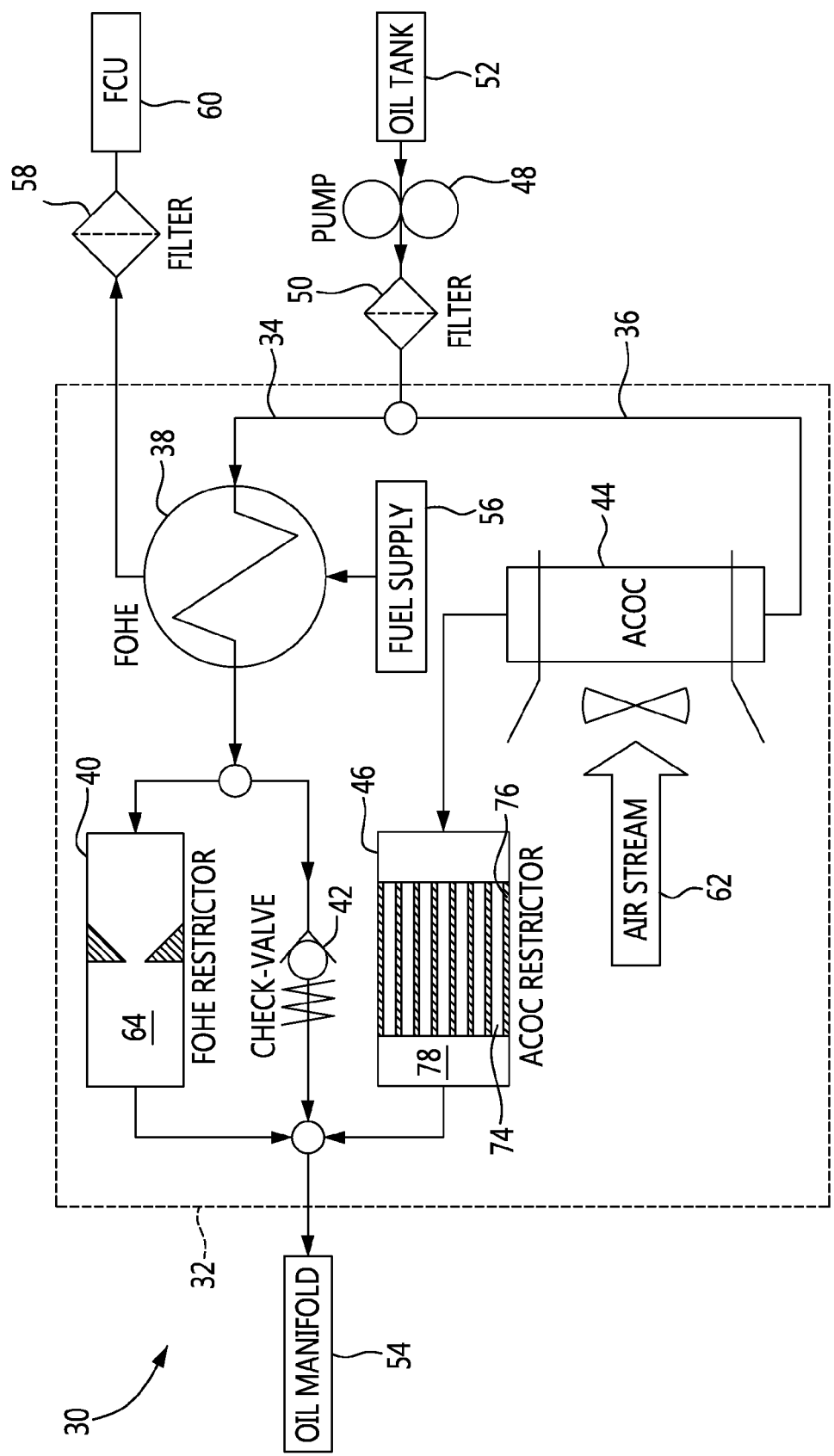
FIG. 2 is a schematic illustration of a heat management system according to one embodiment.

Referring to FIGS. 1 and 2, the heat management system 30 includes an oil circuit illustrated as a block defined by broken lines 32 in FIG. 2. In one embodiment, the oil circuit 32 may include a first branch 34 and a second branch 36 connected in a parallel configuration. The first branch 34 may include a fuel/oil heat exchanger (FOHE) 38 and an FOHE restrictor 40 in series. For example the FOHE restrictor 40 may be disposed downstream of the FOHE 38. Optionally, a pressure relief valve such as a check-valve 42 may also be provided in the first branch 34, for example disposed downstream of the FOHE 38 and parallel to the FOHE restrictor 40.

In one embodiment, the second branch 36 may include an air cooled oil cooler (ACOC) 44 and an ACOC restrictor 46 in series. For example the ACOC restrictor 46 may be disposed downstream of the ACOC 44.

The heat management system 30 may further include an oil pump 48 and oil filter 50 which are disposed upstream of and connected to the oil circuit 32 such that oil pump 48 pumps oil from an oil tank 52 which contains relatively hot oil collected from, for example bearing chambers (not shown) of the engine during engine operation, to the oil circuit 32, splitting the oil into first and second oil flows passing through the respective parallel first and second branches 34, 36. The first and second oil flows from the first and second branches 34, 36 are combined and directed into an engine oil manifold 54 which is disposed downstream of and connected to the oil circuit 32. The engine oil manifold 54 distributes the oil to various locations of the engine to lubricate and cool for example bearings and gears of the engine.

The FOHE 38 includes oil passages (not numbered) forming part of the first branch 34 of the oil circuit and fuel passages (not shown) which are connected in the fuel system. Therefore, cold fuel from a fuel supply 56 can be directed through the FOHE 38 and can be thus heated by the first flow of the hot oil passing through the first branch 34 of the oil circuit 32. The heated fuel from the FOHE 38 may be directed for example, through a filter 58 to an engine fuel control unit FCU 60 which controls fuel delivery at a required rate to the combustion gas generator assembly 26.

The ACOC 44 includes oil passages (not shown) exposed to for example, an ambient air stream 62 passing through a bypass duct (not numbered) of the engine. Therefore, the second oil flow passing through the second branch 36 of the oil circuit 32 is cooled by the relatively cool ambient air stream 62. The oil in the engine oil manifold 54 is a mixture of the first oil flow which passes through the first branch 34 of the oil circuit 32 and is cooled in the FOHE 38 by cold fuel, and the second oil flow which passes through the second branch 36 of the oil circuit 32 and is cooled in the ACOC 44 by the cold ambient air stream 62. Therefore, the oil in the engine oil manifold 54 is cooler than the oil in the oil tank 52.

During engine operation the fuel flow required for combustion and the temperatures of the hot oil flowing through the oil circuit may vary and therefore the heat exchange performed in the FOHE 38 and ACOC 44 must be controlled accordingly. A thermal static valve (also known as a thermal valve) is conventionally used in an engine heat management system for this purpose, as discussed above in the Background of the Art. In the heat management system 30, the thermal valve may be eliminated. The oil flow split between the FOHE 38 and the ACOC 44 is controlled by a combination of the FOHE restrictor 40 and the ACOC restrictor 46, which limits the first and second oil flows through the first and second branches 34, 36 differently, in response to viscosity changes of the oil caused by temperature changes of the oil during engine operation.

According to one embodiment, both the FOHE restrictor 40 and ACOC restrictor 46 are fixed restrictors which, however have different fixed passage geometries. The passage geometry of the ACOC restrictor 46 has a total flow contact area greater than a total flow contact area of the FOHE restrictor 40 such that in response to an oil viscosity increase, the ACOC restrictor 46 provides a larger flow resistance increase than a flow resistance increase provided by the FOHE restrictor 40, in order to change oil flow distribution between the first and second branches 34, 36 of the oil circuit 32.

Figure 4:
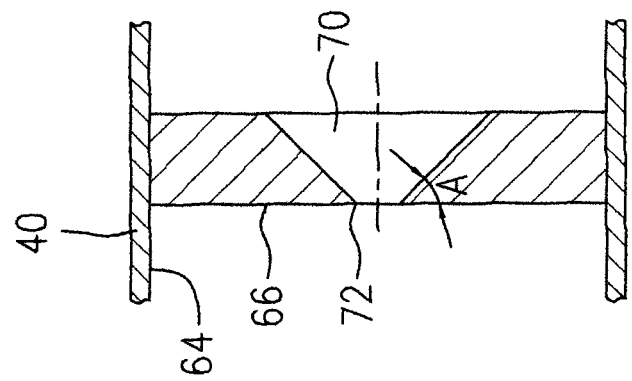
FIG. 4 is a partial cross-sectional view of the FOHE restrictor showing a diaphragm having a sharp edged flow orifice according to another embodiment.
Figure 3:
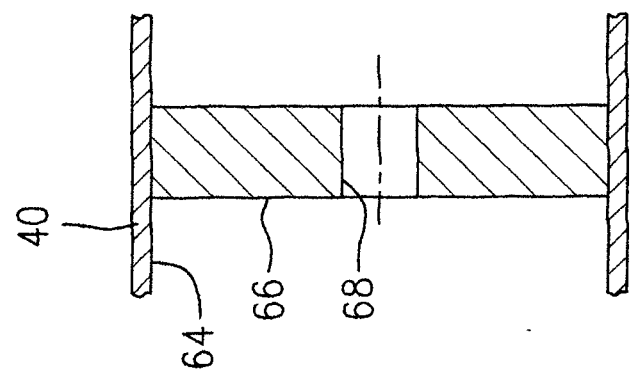
FIG. 3 is a partial cross-sectional view of a fuel/oil heat exchanger (FOHE) restrictor showing a diaphragm having a flow orifice according to one embodiment.

In one embodiment illustrated in FIGS. 2 and 3, the FOHE restrictor 40 may be a calibrated diaphragm restrictor which, for example, includes a flow chamber 64 and a diaphragm 66 disposed within the flow chamber 64 as a partition. The diaphragm 66 defines an orifice 68 extending therethrough to allow the first oil flow in the first branch 34 of the oil circuit 32 to pass through the chamber 64. The orifice 68 is calibrated to limit the first oil flow passing through the FOHE 38 in order to prevent the fuel flow from being overheated. The diameter of the chamber 64 is much larger than the diameter of the orifice 68. Alternatively, the diaphragm 66 according to one embodiment, may define a flow orifice 70 having a sharp annular edge 72 with an edge tip angle A smaller than 90 degrees, as illustrated in FIG. 4.

Figure 5:
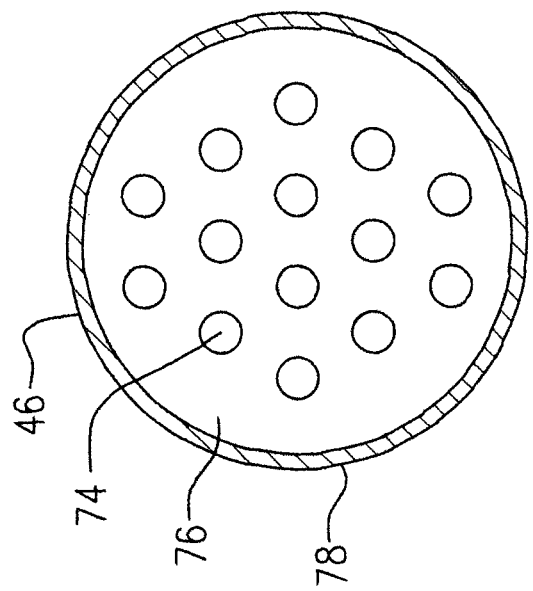
FIG. 5 is a cross-sectional view of an air cooled oil cooler (ACOC) restrictor and a surface of a body with a plurality of small holes extending through the body.

The ACOC restrictor 46 on the other hand, according to one embodiment illustrated in FIGS. 2 and 5, may define a plurality of small and long holes 74 with respect to the flow orifice 68 of the FOHE restrictor 40. The small and long holes 74 extend through a body 76 which is disposed in a flow chamber 78 of the ACOC restrictor 46. Each of the small and long holes 74 has a diameter smaller than an axial length of the hole 74.

The performance of the ACOC 44 may be chosen to provide adequate oil cooling when the engine is operated at high altitudes and the performance of the FOHE 38 is chosen to provide adequate heat transfer from oil into fuel in cold conditions. The ACOC restrictor 46 may be calibrated to allow the second oil flow in the second branch 36 of the oil circuit 32 to flow almost unrestrictedly through the ACOC restrictor 46 when the oil is very hot and thus the oil viscosity is very low. The FOHE restrictor 40 may be calibrated in order to limit the first oil flow through the first branch 34 of the oil circuit to a rate that avoids overheating the fuel flow when the engine is operated at high altitudes and in order to send the rest of the oil to the second oil flow passing through the second branch 36 of the oil circuit. For a given oil temperature, the oil flow split between the first and second branches 34, 36 may remain at approximately the same at any altitude. At lower altitudes the performance of the ACOC 44 improves significantly due to the increased air density and, consequently, increased air mass flowing through the ACOC 44. The increased performance of the ACOC 44 may match the increased engine heat rejection at lower altitudes, which engine heat rejection is also proportional to the increased pressure in the gas path of the engine. There may also be a marginal increase in the heat transferred from oil into fuel in the FOHE 38 due to the increased fuel flow at the lower altitudes.

At a lower ambient temperature the second oil flow in the second branch 36 exiting from the ACOC 44 is cooler. The ACOC restrictor 46 therefore offers increased flow resistance to the second oil flow in the second branch 36 due to increased oil viscosity when the second oil flow in the second branch 36 is cooler. This results in a reduction of the second oil flow through the second branch 36 and a corresponding increase of the first oil flow in the first branch 34 of the oil circuit. Meanwhile, the flow resistance provided by the FOHE restrictor 40 is substantially independent from the temperatures of the first oil flow flowing through the first branch 34 because the flow resistance determined by the fixed geometry of the orifice 68 or 70 of the FOHE restrictor 40 is not significantly affected by oil viscosity changes with respect to the ACOC restrictor 46. The second oil flow reduction in the second branch 36 of the oil circuit when the ambient air temperatures are low, determines further oil cooling in the ACOC 44 (because not only the ambient air stream is cooler but also less oil is concurrently being cooled by the cooler air stream). At lower ambient temperatures, the temperature of the second oil flow exiting from the ACOC 44 reaches the ambient air temperature and the second oil flow in the second branch 36 may be reduced to minimum while the first oil flow in the first branch 34 in the oil circuit 32 is increased to maximum. The increased first oil flow at low ambient air temperatures may ensure that an optimum amount of heat is transferred from the engine oil system to the engine fuel system.

The check-valve 42 (for pressure relief) in the first branch 34 is normally closed and opens only when the oil pressure build-up in the first and second branches 34, 36 in the oil circuit 32, reaches a predetermined level, in order to prevent the FOHE 38 and ACOC 44 from being damaged.

Alternatively, the FOHE restrictor 40 and the check-valve 42 may be combined in one unit, such as a pressure relief valve with calibrated flow leakage.

The heat management system 30 may eliminate or reduce the requirement for thermal valves, or for commanded/actuated control valves. The combination of the fixed restrictors 40, 46, with an optional pressure relief valve, is simpler, cheaper and may have significantly better reliability than thermal valves or commanded/actuated control valves, for controlling oil flow distribution between the ACOC and the FOHE 38, 44. The heat management system 30 allows a relatively simple system architecture and optimum component sizing. It should also be noted that since oil viscosity changes exponentially with respect to oil temperature, the thermal control offered by the heat management system 30 may therefore be quite accurate and without hysteresis.

The above description is meant to be exemplary only, and one skilled in the art will recognize that changes may be made to the embodiments described without departure from the scope of the described subject matter. For example, the fixed passage geometries of the respective FOHE restrictor 40 and ACOC restrictor 46 may be any suitable and may thus vary from the structures in the described embodiments. The oil circuit 32 of the heat management system as described above, may be alternatively positioned to receive used hot oil from bearing chambers and to discharge cooled oil to an oil tank of the engine. Still other modifications which fall within the scope of the described subject matter will be apparent to those skilled in the art, in light of a review of this disclosure, and such modifications are intended to fall within the appended claims.

The invention claimed is:

1. A heat management system of a gas turbine engine for cooling oil and heating fuel, the heat management system comprising an oil circuit having a first branch and a second branch connected in parallel, the first branch including a fuel/oil heat exchanger for transferring heat from an oil flow through the first branch to a fuel flow, and a first fixed restrictor for restricting the oil flow through the first branch, wherein the first fixed restrictor includes a diaphragm having a flow orifice, the second branch including an air cooled oil cooler for air cooling an oil flow through the second branch and a second fixed restrictor for restricting the oil flow through the second branch, wherein the second fixed restrictor includes a plurality of holes extending through a body, the plurality of holes being smaller in diameter and longer in axial length than the flow orifice of the first fixed restrictor such that the second fixed restrictor has a total flow contact area greater than a total flow contact area of the first fixed restrictor so that in response to an oil viscosity increase, a flow resistance increase of the second fixed restrictor is greater than a flow resistance increase of the first fixed restrictor to modify oil flow distribution between the first and second branches.

2. The heat management system as defined in claim 1 wherein the first fixed restrictor is disposed downstream of the fuel/oil heat exchanger and the second fixed restrictor is disposed downstream of the air cooled oil cooler.

3. The heat management system as defined in claim 2 wherein the first branch further comprises a pressure relief valve disposed downstream of the fuel/oil heat exchanger and in parallel connection with the first fixed restrictor.

4. The heat management system as defined in claim 1 comprising an oil pump disposed upstream of the oil circuit.

5. The heat management system as defined in claim 1 comprising an engine oil manifold disposed downstream of the oil circuit.

6. The heat management system as defined in claim 1 wherein the fuel flow is directed from an engine fuel supply to an engine fuel control unit.

7. The heat management system as defined in claim 1 wherein the first fixed restrictor is a calibrated diaphragm restrictor.

8. A heat management system of a gas turbine engine for cooling oil and heating fuel, the heat management system comprising an oil circuit having connected a first branch and a second branch in a parallel configuration, the first branch including a fuel/oil heat exchanger for transferring heat from an oil flow through the first branch to a fuel flow, and a first fixed restrictor disposed downstream of the fuel/oil heat exchanger for restricting the oil flow through the first branch, the second branch including an air cooled oil cooler for air cooling an oil flow through the second branch and a second fixed restrictor disposed downstream of the air cooled oil cooler for restricting the oil flow through the second branch, wherein the first fixed restrictor includes a diaphragm having a flow orifice and the second fixed restrictor includes a plurality of holes extending through a body, the plurality of holes being smaller in diameter and longer in axial length than the flow orifice of the first fixed restrictor, such that the second fixed restrictor has a total flow contact area greater than a total flow contact area of the first fixed restrictor so that a flow resistance increase of the second fixed restrictor is greater than a flow resistance increase of the first fixed restrictor in response to an oil viscosity increase.

9. The heat management system as defined in claim 8 wherein the first branch comprises a pressure relief valve disposed downstream of the fuel/oil heat exchanger and in parallel connection with the first fixed restrictor.

10. The heat management system as defined in claim 8 wherein the flow orifice of the first fixed restrictor has an annular edge having an edge tip angle of less than 90 degrees.

11. The heat management system as defined in claim 8 wherein each of the holes of the second fixed restrictor has a diameter smaller than an axial length of the hole.

* * * * *